UNITED STATES PATENT OFFICE.

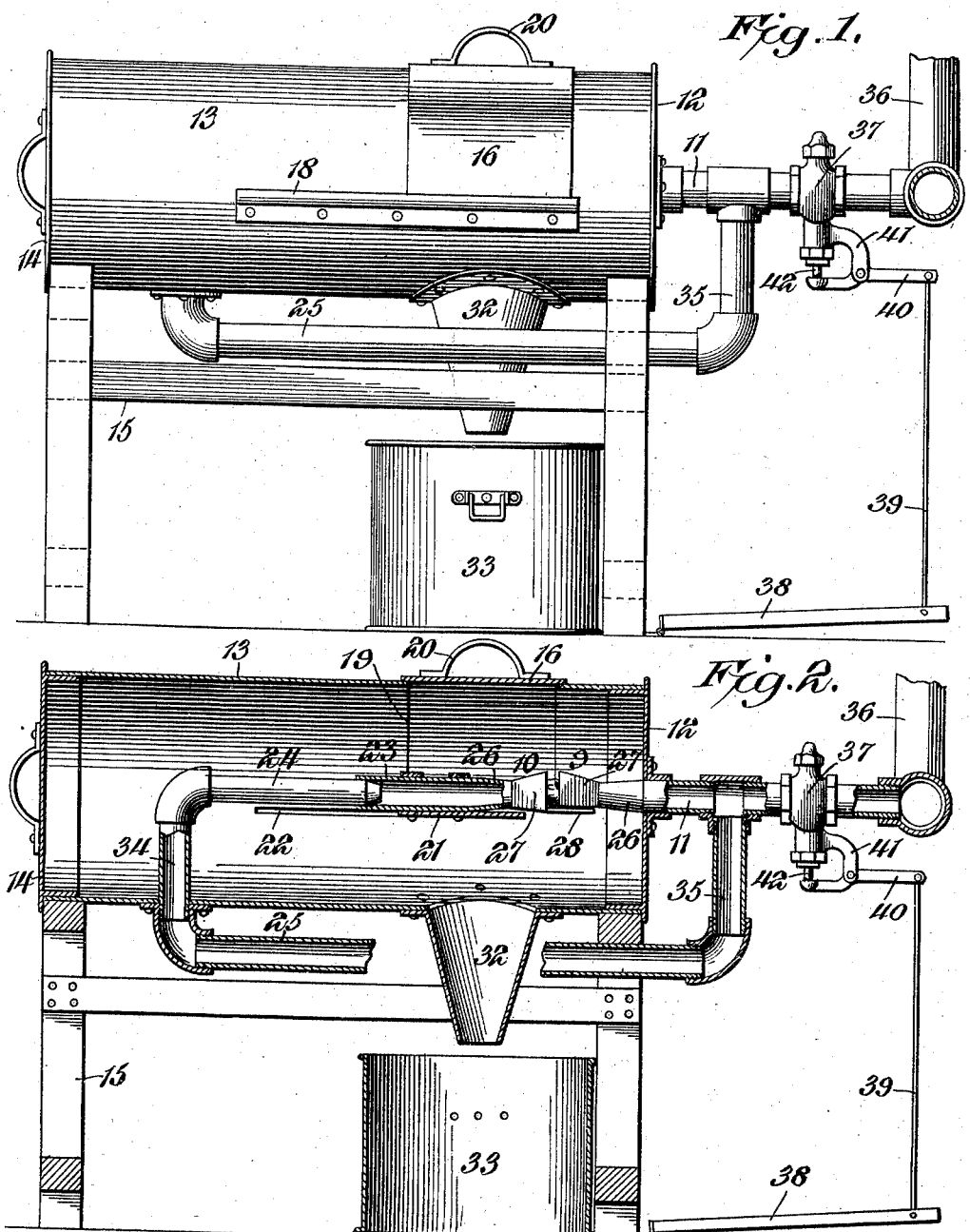

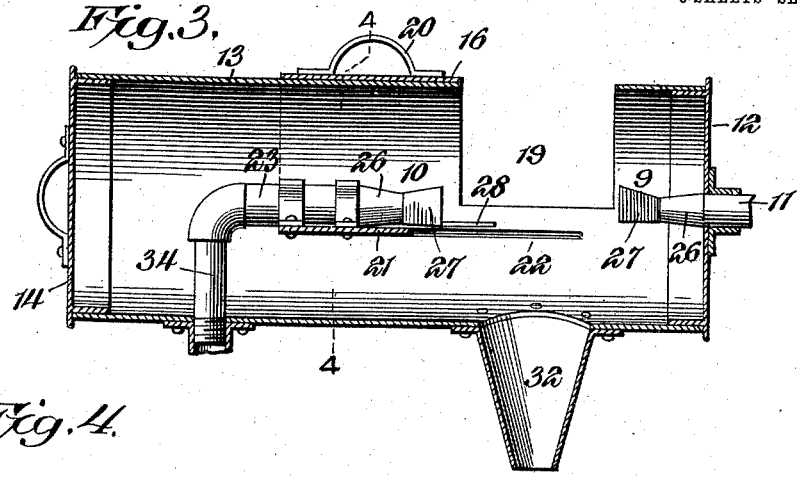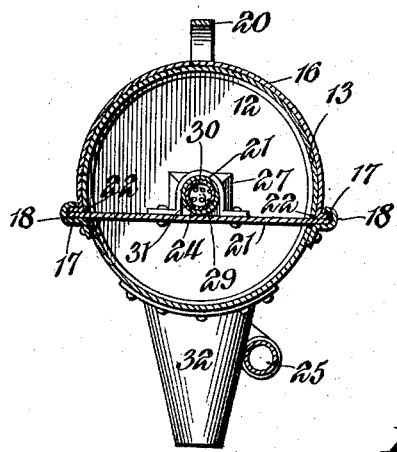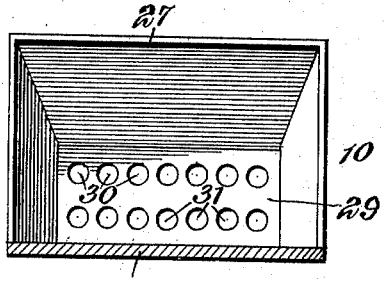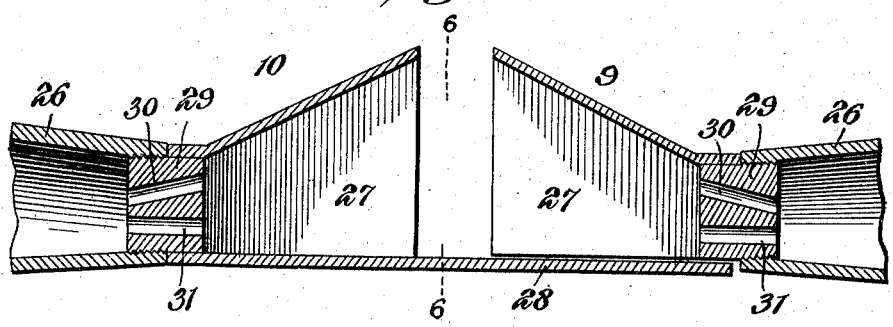

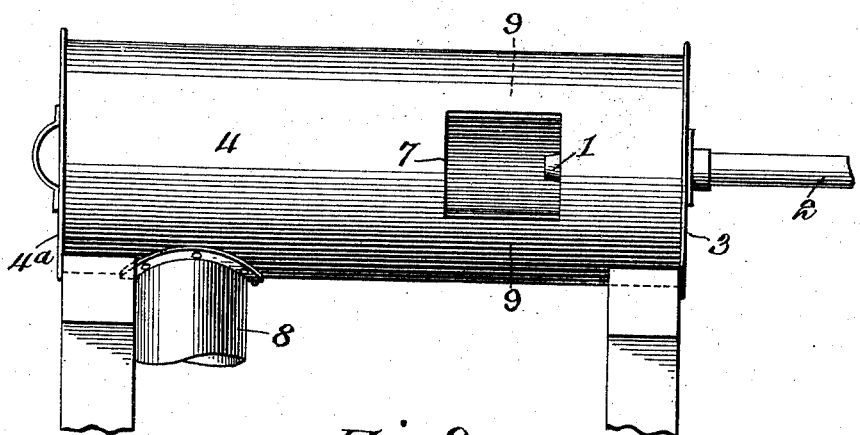
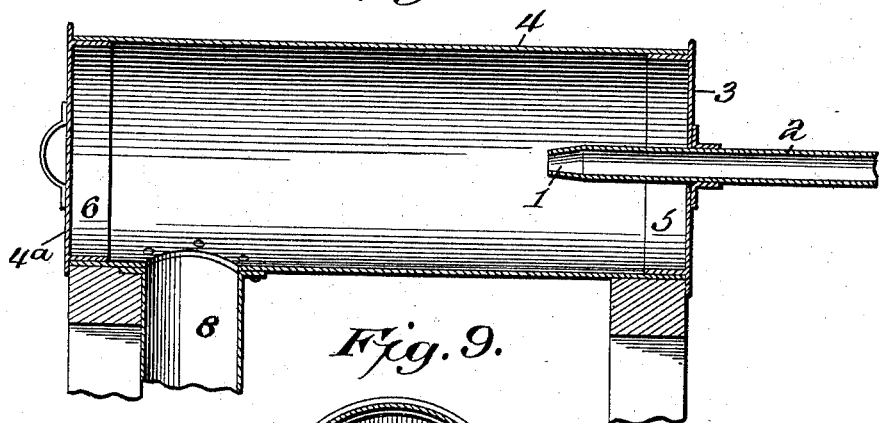
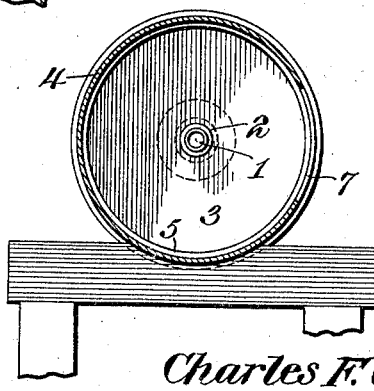

CHARLES FORRESTER GREINER, OF BILOXI, MISSISSIPPI.

APPARATUS FOR PICKING CRABS AND OTHER CRUSTACEA.

965,706.

Specification of Letters Patent. Patented July 26, 1910.

Application filed June 22, 1909. Serial No. 503,677.

*To all whom it may concern:*

Be it known that I, CHARLES F. GREINER, a citizen of the United States, residing at Biloxi, in the county of Harrison and State of Mississippi, have invented a new and useful Apparatus for Picking Crabs and other Crustacea, of which the following is a specification.

The invention relates to an apparatus for picking crabs and other crustacea.

The object of the present invention is to provide a simple, practical and comparatively inexpensive apparatus, whereby the meat of crabs and other crustacea may be separated from the relatively fragile shells thereof without crushing or breaking the shells, or permitting the same to be included with the meat and without damaging the meat to any extent.

Another object of the invention is to provide an apparatus of this character equipped with means for directing one or more jets of compressed air, steam or liquid fluid against the shell of a crab, lobster, or the like for blowing away and disengaging the meat of the animal from the shell or bones thereof.

Furthermore, the invention has for its object to provide a crab picking apparatus having nozzles, arranged to pick and hold a crab, or other animal while the meat is being picked therefrom, and capable of being readily operated to clamp a crab and to release the picked shell.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of an apparatus for picking crabs and other animals, illustrating the preferred form of the invention. Fig. 2 is a longitudinal sectional view of the same, the clamping nozzles being closed. Fig. 3 is a longitudinal sectional view, the clamping nozzles being open. Fig. 4 is a transverse sectional view on the line 4—4 of Fig. 3. Fig. 5 is an enlarged detail sectional view, illustrating the construction of the crab clamping nozzles. Fig. 6 is a sectional view on the line 6—6 of Fig. 5. Fig. 7 is a side elevation of an apparatus, illustrating the simplest form of the invention. Fig. 8 is a longitudinal sectional view of the same. Fig. 9 is a transverse sectional view on the line 9—9 of Fig. 7.

Like numerals of reference designate corresponding parts in all the figures of the drawings.

The simplest embodiment of the invention is illustrated in Figs. 7 to 9 inclusive of the drawings in which a single fixed nozzle 1 is employed for picking the crab meat. The nozzle 1, which is preferably tapered, as shown, is arranged at the inner end of a pipe or tube 2, which is connected with a suitable source of compressed air, but steam or any other liquid or aeriform fluid under pressure may be employed as a meat cleaning or picking medium for removing the meat of crabs, lobsters, or other crustacea from the shells, and when steam is employed, it may be utilized for cooking the meat simultaneously with the picking thereof. The pipe or tube pierces one end or head 3 of a horizontal cylindrical casing 4, which is preferably mounted on suitable supports. The end or head 3 and the other end or head 4ª of the cylindrical casing are provided with annular flanges 5 and 6, engaging the body portion of the casing and adapted to be removed for enabling the apparatus to be conveniently cleaned after use. The rear head 4ª is provided at the exterior with a suitable handle to facilitate its removal. The nozzle projects into the casing a short distance beyond one end of the same and the body of the casing is provided opposite the end of the nozzle with a rectangular aperture 7, adapted to permit the hand of the operator to be inserted within the casing for holding a crab in front of the nozzle in position to be operated on by the jet discharged therefrom. The casing is provided near the other end with a depending tubular outlet 8 through which the picked crab meat is blown, and a suitable receptacle may be placed beneath the outlet for collecting the crab meat.

In preparing the crab, lobster or other like animal, the legs and claws are removed and the upper shell is also detached, after which the crab is cleaned and the body cut in two for convenience in manipulating.

The sections of the shell thus left with the meat attached thereto by interior shells and septums are placed one at a time in front of the nozzle by the operator, and when the meat has been thoroughly separated from the shell, the latter is removed and another section is placed in the apparatus.

In practice the apparatus shown in Figs. 7 to 9 inclusive will be equipped with a valve similar to that shown in connection with the preferred form of invention, hereinafter described, for controlling the discharge of compressed air or other picking medium. The compressed air or other fluid under pressure acts to detach the meat from the shell and blow it through the outlet, leaving both the internal and external shell of the crab, or other crustacea entirely cleaned and the picked crab meat free from the shell.

I have found by experience that by the apparatus just described the meat may be separated from the shell of the crabs in a most effective manner, and that the work is expeditiously performed with none of the handling and labor incident to picking crabs manually.

In Figs. 1 to 5 inclusive of the drawings is illustrated the preferred form of the invention in which the crab or other crustacea is clamped between a pair of relatively movable nozzles 9 and 10. The nozzle 9 is carried by a pipe or tube 11, piercing the front end or head 12 of a cylindrical casing 13, which is also provided at the other end with a removable head 14 having a handle. The heads 12 and 14, which are provided with annular flanges similar to those heretofore described, are detached for convenience in cleaning the apparatus. The cylindrical casing 13, which is disposed horizontally, is preferably mounted on a suitable supporting frame 15, and it is provided at the front portion with a slidable closure 16, constituting a section of the top portion of the casing, and arranged to cover and uncover an opening thereof to afford access to the interior of the casing and to close the same to prevent the crab meat from being scattered. The slidable closure 16, which is approximately semi-cylindrical, has its ends bent outward to form flanges 17, which are interlocked with horizontal guides or ways 18, formed by strips of sheet metal, or other suitable material, riveted or otherwise secured to the exterior of the casing and having their upper portions bent into substantially semi-cylindrical form to provide inner grooves, as clearly illustrated in Fig. 4 of the drawings. By this construction the closure for the opening 19 is slidably interlocked with the casing. The slidable closure 16, which is provided with a suitable operating handle 20, carries a horizontal support 21, consisting of a transversely disposed plate, extending across the casing and projecting outward through longitudinal side slots 22 thereof, and slidable back and forth with the cover to carry the nozzle 10 toward and from the coöperating nozzle 9. The nozzle 10, which co-acts with the nozzle 9 to form a clamp for holding the crab, is connected with a slidable pipe section or tube 23, which telescopes over a fixed pipe section or tube 24 to form an extensible tubular connection between the movable nozzle and the branch pipe or tube 25, but a flexible tube may be employed, if desired, for connecting the movable nozzle with the branch pipe or tube 25. Each nozzle consists of an inner tapered tubular portion 26 and an outer tapering hood 27, composed of sides and a connecting top portion. The bottom of the hood of the nozzle 9 is open, and the other nozzle 10 is provided with a horizontal bottom wall or plate 28, adapted to support a crab and projecting outward and adapted to extend beneath the open bottom of the hood of the nozzle 9, when the nozzles are arranged in their clamping position, as illustrated in Figs. 2 and 5 of the drawings. Each nozzle is also provided with a transverse block or piece 29, having upper and lower rows 30 and 31 of jet openings, adapted to discharge jets of compressed air or other cleaning medium upon the crab, or other animal. The upper row or series of apertures are set at an inclination, and the lower ones are disposed horizontally, as illustrated in Fig. 5 of the drawings, but the jet apertures may be arranged in any other desired manner, and may be varied in number to adapt the nozzles for different crustacea. The movable nozzle is operated by a single movement of the slidable closure 16, which is moved in one direction to open the casing and the clamp, and in the opposite direction to close the casing and clamp the crab placed on the supporting bottom wall or member of the movable nozzle. In cleaning the crab with the oppositely disposed nozzles, it is unnecessary to divide the crab, and the meat will be blown out at the center, the hoods of the nozzles being spaced a sufficient distance apart to permit the ready discharge of the picked meat, which drops through a downwardly tapered outlet 32, depending from an opening in the bottom of the casing and adapted to enable the meat to be readily collected in a suitable receptacle 33.

The branch pipe or tube 25 has a rear depending vertical portion 34, which pierces the bottom of the casing at the rear portion thereof, and the said branch 25 extends horizontally beyond the front end of the casing, and is connected by a vertical portion 35 with the horizontal pipe or tube 11, which extends to the nozzle 9. The pipe 11 forms a portion of a horizontal conduit, which is connected with a suitable conduit 36 for supplying compressed air, or other crab picking medium to the apparatus. A valve 37 is interposed between the conduit 36 and the horizontal tube or pipe 11 and the branch pipe 35 for controlling the supply of compressed air. The valve, which may be of any suitable construction, is preferably connected with a treadle 38 for enabling it to be operated by foot. The treadle 38, which is suitably hinged or pivoted at its inner end, is connected at its outer end by a rod 39 with a lever 40, fulcrumed at an intermediate point to an arm 41 of the valve casing and is arranged to engage the valve stem 42. In practice the valve will be normally maintained in its closed position by a suitable spring, and the pressure of the foot on the treadle will open the valve against the action of such spring, which will close the valve and shut off the supply of compressed air as soon as the pressure of the foot is removed from the treadle.

By the term "nozzle" in the claims, I wish it understood as comprehending either a flared or enlarged outlet for the conduit, as illustrated in Figs. 1 to 6 inclusive, or a tapered or reduced outlet, as shown in Figs. 7 to 9 inclusive, or an outlet of any intermediate size.

Having thus fully described my invention, what I claim as new and desire to secure by Letters Patent, is—

1. An apparatus for cleaning meat from the shells of crustacea and other like animals including a meat picking nozzle having means for supporting an animal, and a conduit connected with the nozzle for the passage of the meat picking medium.

2. An apparatus for cleaning meat from the shells of crustacea and other like animals including a casing adapted to receive the animals and catch the meat blown from the shell and provided with an outlet for the picked meat, a nozzle arranged to discharge a jet of compressed air or other fluid under pressure against the animal to be picked, and a conduit connected with the nozzle for the passage of the meat picking fluid.

3. An apparatus for cleaning meat from the shells of crustacea and other like animals including a casing for catching the meat blown from the shell having an inlet opening and adapted to receive the animal to be picked, and provided with an outlet for the discharge of the picked meat, a conduit extending into the casing, and a meat picking nozzle connected with the conduit.

4. An apparatus for cleaning meat from the shells of crustacea and other like animals including a nozzle provided with a hood, means for supporting the animal to be picked and cleaned adjacent to the hood, and a conduit for the picking medium connected with the nozzle.

5. An apparatus for cleaning meat from the shells of crustacea and other like animals including a meat picking or cleaning nozzle provided with a tapered hood arranged to receive the animal to be picked and provided with means for supporting the same within the hood, and a conduit for the meat picking medium connected with the nozzle.

6. An apparatus for cleaning meat from the shells of crustacea and other like animals including a meat cleaning or picking nozzle having a hood for the reception of the animal to be picked or cleaned and having means for supporting the animal within the hood, said nozzle being provided with a plurality of jet apertures located at the inner end of the hood, and a tube or conduit for the meat picking medium connected with the nozzle.

7. An apparatus for cleaning meat from the shells of crustacea and other like animals including a pair of co-acting nozzles having opposite hoods arranged to receive the animals to be cleaned or picked and relatively movable to clamp the same, and conduits for the meat picking or cleaning medium connected with the nozzles.

8. An apparatus for cleaning meat from the shells of crustacea and other like animals including a pair of relatively movable nozzles provided with tapered hoods arranged to receive and clamp the animal to be picked and spaced apart for the discharge of the meat, and conduits for the meat picking medium connected with the nozzles.

9. An apparatus for cleaning meat from the shells of crustacea and other like animals including a pair of meat picking or cleaning nozzles provided with hoods for the reception of the animal to be picked or cleaned, one of the hoods being open at the bottom and the other being provided with an extended bottom for supporting the animal, and tubes or conduits for the picking medium connected with the nozzles.

10. An apparatus for cleaning meat from the shells of crustacea and other like animals including a pair of meat picking nozzles provided with hoods for the reception of the animal to be picked or cleaned, one of the said nozzles being fixed and the other being movable toward and from the fixed nozzle to clamp and release the animal, and conduits for the picking medium connected with the nozzles.

11. An apparatus for cleaning meat from the shells of crustacea and other like animals including a casing having an inlet aperture and provided with a movable closure for the same, a pair of co-acting meat picking nozzles located within the casing and arranged to receive the animal to be picked or cleaned, one of the nozzles being connected with the closure and movable toward and from the other nozzle by the said closure.

12. An apparatus for cleaning meat from the shells of crustacea and other like animals including a casing having an aperture and provided with a slidable closure for the same, and a pair of co-acting meat picking nozzles located within the casing and provided with hoods for the reception of the animal to be picked or cleaned, one of the nozzles being movable toward and from the other and means for connecting the movable nozzle with the closure.

13. An apparatus for cleaning meat from the shells of crustacea and other like animals including a casing having an aperture including a slidable closure, an interior support extending across the casing and connected with and carried by the slidable closure, and a pair of co-acting meat picking or cleaning nozzles, one of the nozzles being mounted on the support and carried toward and from the other nozzle by the movement of the closure.

14. An apparatus for cleaning meat from the shells of crustacea and other like animals including a casing having an aperture and provided at opposite sides with guides, said casing being also provided with horizontal slots concealed by the guides, a slidable closure interlocked with the guides, an interior support extending through the slots and connected with the closure, and coöperating meat picking nozzles, one of the nozzles being mounted on and carried toward and from the other nozzle by the movement of the closure.

15. An apparatus for cleaning meat from the shells of crustacea and other like animals including a casing, opposite co-acting meat picking or cleaning nozzles located within the casing, one of the nozzles being movable toward and from the other, a fixed conduit connected with the other nozzle, and a branch conduit having a movable portion connected with the movable nozzle.

16. An apparatus for cleaning meat from the shells of crustacea and other like animals including a casing, opposite co-acting meat picking or cleaning nozzles located within the casing, one of the nozzles being movable toward and from the other, a fixed conduit connected with the other nozzle, and a branch conduit having telescopic sections, one of which is connected with the movable nozzle.

17. An apparatus for cleaning meat from the shells of crustacea and other like animals including a casing for catching the meat blown from the shell, a meat picking or cleaning nozzle inclosed within the casing, a conduit piercing the casing and connected with the nozzle, a valve for controlling the passage of the meat picking medium through the conduit, and a treadle connected with the valve.

18. A means for cleaning the meat from the shells of crabs and other crustacea including means for supplying air or other fluid, an outlet for directing the fluid against the shell to remove the meat therefrom, and means inclosing the outlet for catching the meat blown from the shell.

19. An apparatus for cleaning meat from the shells of crustacea and other like animals including a pair of co-acting nozzles, means for supporting a crab or other animal between the nozzles, and a conduit for the meat picking or cleaning medium connected with the nozzles.

20. An apparatus for cleaning meat from the shells of crustacea and other like animals including a casing having an inlet aperture and provided with a movable closure for the same, a holding device for supporting a crab or other animal within the casing, said device being actuated by the movement of the said closure, and a conduit having an outlet arranged to discharge a meat picking medium upon a crab or other animal held by the said device.

21. An apparatus for cleaning meat from the shells of crustacea and other like animals including a conduit for the passage of the meat picking medium, said conduit having an outlet, and means for supporting an animal in a fixed position adjacent to the outlet.

22. A means for cleaning the meat from the shells of crabs and other crustacea including means for supplying air or other fluid having an outlet for directing the fluid against the shell to remove the meat therefrom, and inclosing means adjacent to the outlet for catching the meat blown from the shell.

In testimony, that I claim the foregoing as my own, I have hereto affixed my signature in the presence of two witnesses.

CHARLES FORRESTER GREINER.

Witnesses:
L. M. PARTRIDGE,
W. H. CHAMPLIN.